US008859871B2

(12) United States Patent
Liao

(10) Patent No.: US 8,859,871 B2
(45) Date of Patent: Oct. 14, 2014

(54) DRUMSTICK WEIGHT ADJUSTMENT STRUCTURE

(76) Inventor: Tsun-Chi Liao, Taichung (TW)

( * ) Notice: Subject to any disclaimer, the term of this patent is extended or adjusted under 35 U.S.C. 154(b) by 213 days.

(21) Appl. No.: 13/611,445

(22) Filed: Sep. 12, 2012

(65) Prior Publication Data

US 2014/0069259 A1 Mar. 13, 2014

(51) Int. Cl.
*G01D 13/02* (2006.01)

(52) U.S. Cl.
CPC .................................... *G01D 13/02* (2013.01)
USPC ....................................................... 84/422.4

(58) Field of Classification Search
CPC ..................................................... G10D 13/02
USPC ............................................. 84/422.4, 422.1
See application file for complete search history.

(56) References Cited

U.S. PATENT DOCUMENTS

| | | | | |
|---|---|---|---|---|
| 1,343,164 | A * | 6/1920 | Smith | 84/422.1 |
| 4,200,025 | A * | 4/1980 | Currier | 84/422.1 |
| 5,932,824 | A * | 8/1999 | Liao | 84/422.1 |
| 7,122,730 | B2 * | 10/2006 | Takegawa | 84/422.1 |

* cited by examiner

*Primary Examiner* — Jianchun Qin

(74) *Attorney, Agent, or Firm* — Muncy, Geissler, Olds & Lowe, P.C.

(57) ABSTRACT

A drumstick weight adjustment structure includes a plastic stick holder and at least one weight block. The plastic stick holder has at least one hole. The weight block can be inserted into the hole and tightly held therein, and also can be removed therefrom. Users can adjust the number of the weight block held in the hole according to requirements to change the weight of the plastic stick holder, thereby change the force of the plastic stick holder striking a drum to generate desired timbre to meet use requirements.

9 Claims, 5 Drawing Sheets

DRUMSTICK WEIGHT ADJUSTMENT STRUCTURE

FIELD OF THE INVENTION

The present invention relates to a drumstick and particularly to a drumstick weight adjustment structure.

BACKGROUND OF THE INVENTION

A drumstick is used to strike drums to generate sound that mainly determines the rhythm of music, hence plays an important role in a music band. The timbre of a drum generated by striking of the drumstick is mainly determined by the characteristics of the drum, the weight of the drumstick also has some effect. For instance, the heavier drumstick generally generates heavier and somber timbre, while the lighter weight drumstick generates lighter and snappier timbre.

In a conventional music band the drumstick usually is installed onto a foot pedal to allow a drummer to control the percussion rhythm via a foot. To match the characteristics of a movement being performed, different weights of drumsticks could be used. Hence before the performance the drumstick has to be changed with a desired weight to meet requirement.

However, to change the drumstick in the short interval of performance is impractical and risky. Without being properly mounted onto the foot pedal the timbre could be lost or even unusable, and result in performance disruption.

SUMMARY OF THE INVENTION

The primary object of the present invention is to provide a drumstick weight adjustment structure that allows the weight of a drumstick to be changed quickly and simply to meet use requirements.

To achieve the foregoing object the drumstick weight adjustment structure of the invention includes a plastic stick holder and at least one weight block. The plastic stick holder has at least one hole. The weight block can be inserted into the hole and tightly held therein, and also can be removed therefrom.

Thus, a user can adjust the number of the weight block held in the hole according to requirements to change the weight of the plastic stick holder. Thereby the striking force of the plastic stick holder on the drum also changes to make the timbre generated by the drum to meet requirement.

The foregoing, as well as additional objects, features and advantages of the invention will be more readily apparent from the following detailed description, which proceeds with reference to the accompanying embodiment and drawings. The embodiment merely serves for illustrative purpose and is not the limitation of the invention.

DETAILED DESCRIPTION OF THE PREFERRED EMBODIMENT

Figure 1:
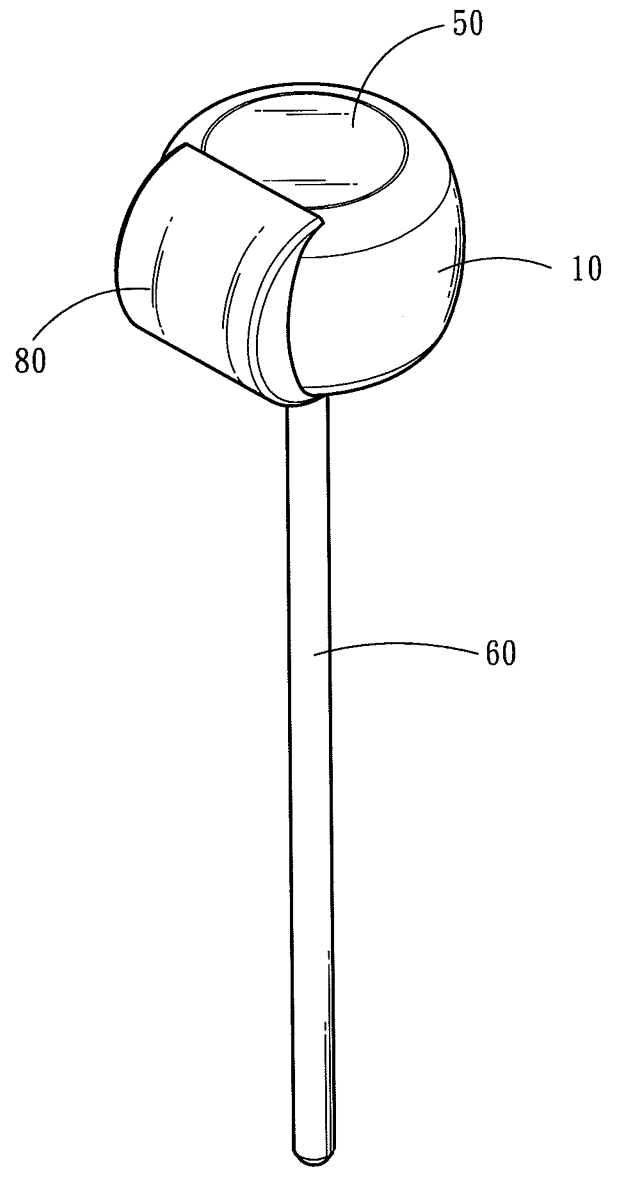
FIG. 1 is a perspective view of the invention.
Figure 2:
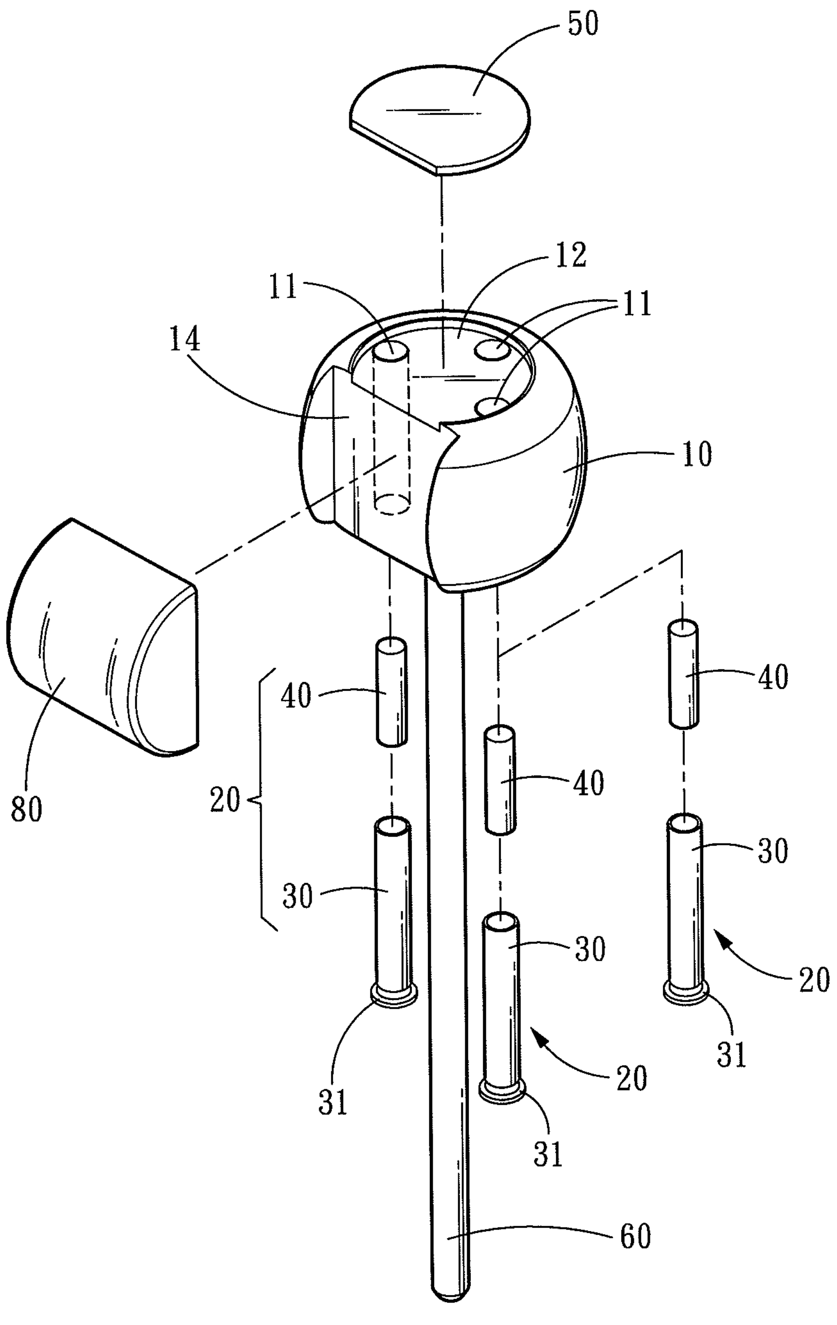
FIG. 2 is an exploded view of the invention.
Figure 3:
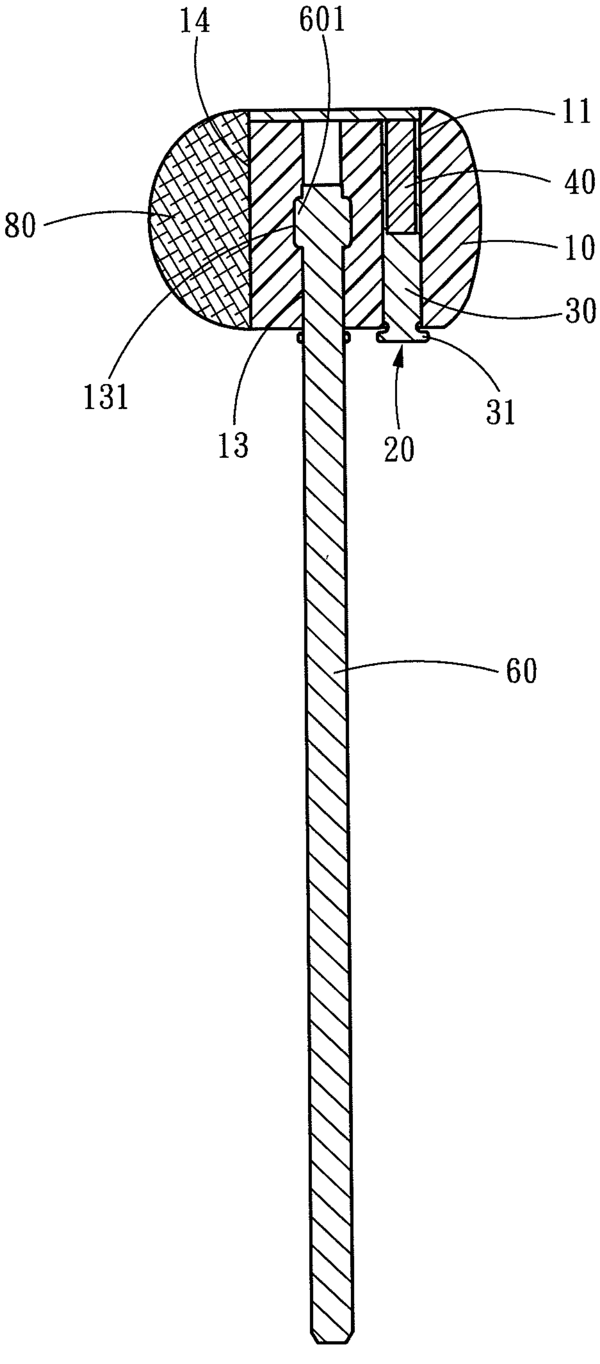
FIG. 3 is a sectional view of the invention.

Please referring to FIGS. 1, 2 and 3, the present invention aims to provide a drumstick weight adjustment structure. It comprises a plastic stick holder 10 and at least one weight block 20. The plastic stick holder 10 has at least one hole 11. The weight block 20 can be inserted into the hole 11 and tightly held therein, and also can be removed therefrom. In this embodiment three sets of holes 11 are provided as an example, but not the limitation.

The weight block 20 can include a copper tube 30 and a powerful magnet 40 inserted and held in the copper tube 30 so that the weight block 20 gets a weight desired. To facilitate loading and unloading of the weight block 20 into and from the hole 11, the copper tube 30 has a handheld flange 31 at one end and another end inserted and embedded into the hole 11 with only the handheld flange 31 exposed outside to be grasped by a user's hand.

The plastic stick holder 10 has a recess 12. The hole 11 runs through the plastic stick holder 10 and communicates to the recess 12. The recess 12 is covered by a magnetic steel lid 50. The weight block 20 has a magnetic force attracted to the magnetic steel lid 50. The magnetic force of the weight block 20 comes from the powerful magnet 40 held in the copper tube 30. With the magnetic steel lid 50 and powerful magnet 40 attracted to each other, the weight block 20 does not drop away due to vibration generated by striking of the plastic stick holder 10.

Figure 4:
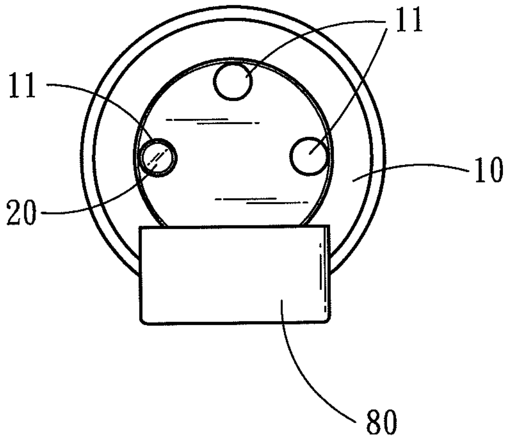
FIG. 4 is a schematic view of changing the weight according to the invention in one embodiment.
Figure 5:
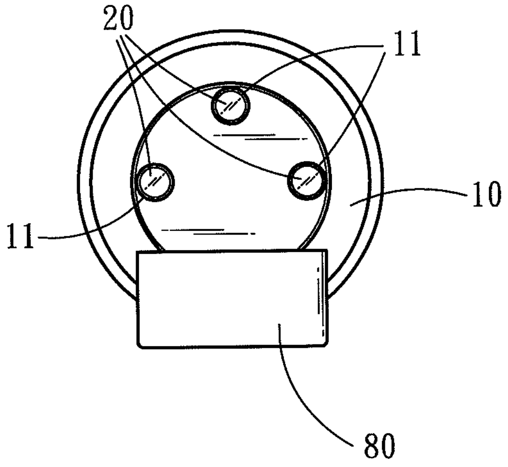
FIG. 5 is a schematic view of changing the weight according to the invention in another embodiment.

Also referring to FIGS. 4 and 5, the weight of the plastic stick holder 10 can be adjusted by selecting the installed number of the weight block 20. When a smaller number of the weight block 20 is installed (referring to FIG. 4, only one set is installed), the plastic stick holder 10 is at a lighter weight, hence can generate lighter and snappier timbre. When a greater number of the weight block 20 is installed (referring to FIG. 5, three sets are installed), the plastic stick holder 10 is at a heavier weight, hence can generate heavier and somber timbre.

Figure 6:
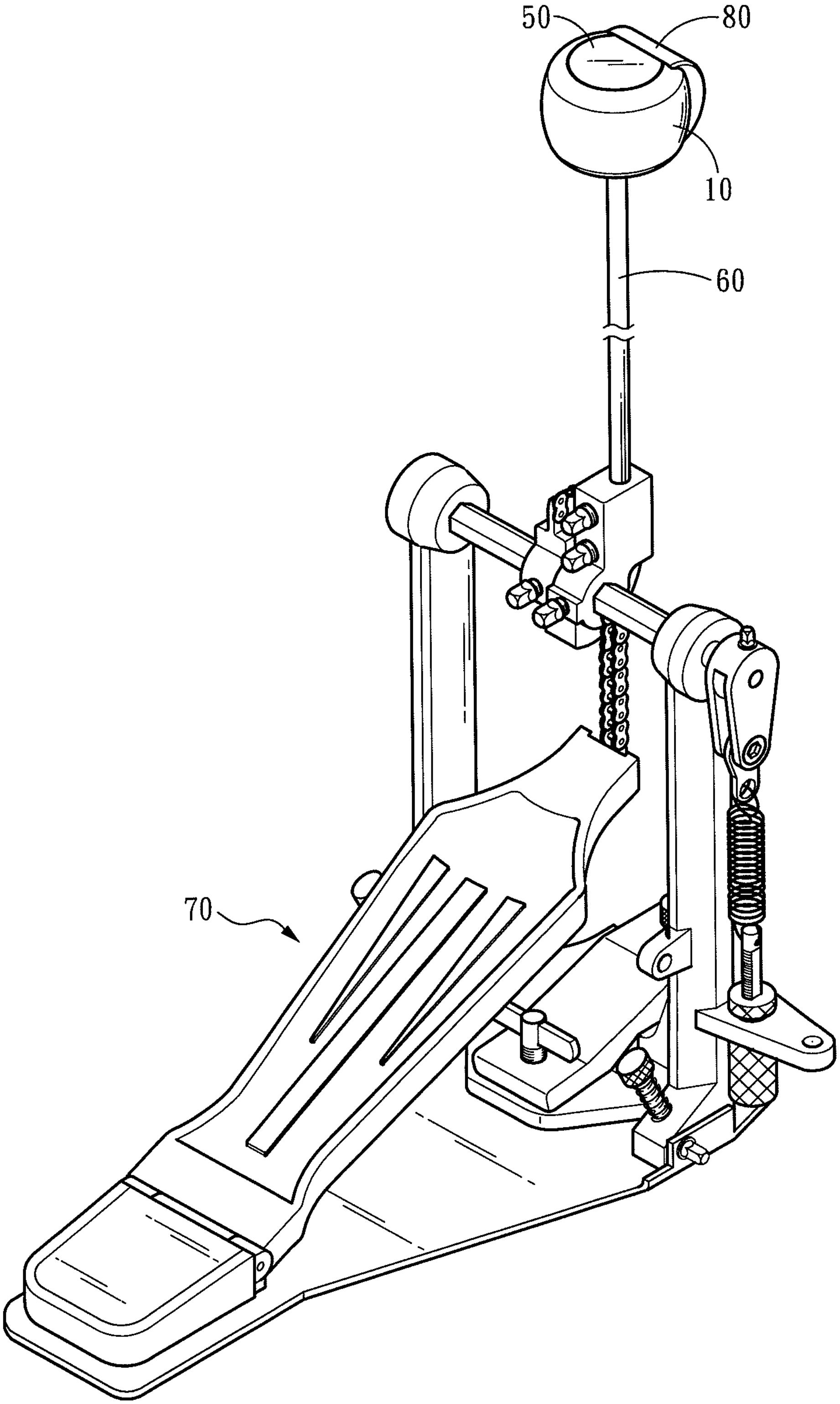
FIG. 6 is a schematic view of the invention in a use condition.

Please referring to FIG. 6, the plastic stick holder 10 can also have a mounting hole 13 insertable by a steel bar 60. The steel bar 60 is installed on a foot pedal 70 to drive the plastic stick holder 10 moving. The mounting hole 13 has a latch trough 131, the steel bar 60 has a jutting rim 601 latchable firmly on the latch trough 121. The plastic stick holder 10 further can have a felt 80 installed thereon to serve as a contact surface to strike the drum. The plastic stick holder 10 also can have a notch 14 latched by the felt 80 to enhance the strength of the structure.

As a conclusion, the weight of the plastic stick holder of the invention can be changed according to the requirement of the timbre of drums by selecting a desired number of weight blocks held in the holes. Because of magnetic attraction between the magnetic steel lid and powerful magnet the weight blocks do not drop away. Operation is simpler and quicker, and can better meet use requirements.

What is claimed is:

1. A drumstick weight adjustment structure, comprising:

a plastic stick holder containing at least one hole; and at least one weight block insertable tightly and securely 5 into the hole and removable therefrom;

wherein the weight block includes a copper tube and a magnet which is insertable into the copper tube and securely held therein.

2. The drumstick weight adjustment structure of claim 1, wherein the copper tube includes one end formed a handheld flange and another end insertable and embedded into the hole to expose the handheld flange.

3. The drumstick weight adjustment structure of claim 1, wherein the plastic stick holder includes a recess, the hole running through the plastic stick holder and communicating to the recess, the recess holding a magnetic steel lid, the weight block being magnetic attracting to the magnetic steel lid.

4. The drumstick weight adjustment structure of claim 3, wherein the weight block includes a copper tube and a magnet which is insertable into the copper tube and securely held therein.

5. The drumstick weight adjustment structure of claim 4, wherein the copper tube includes one end formed a handheld flange and another end insertable and embedded into the hole to expose the handheld flange.

6. The drumstick weight adjustment structure of claim 1, wherein the plastic stick holder includes a mounting hole insertable by a steel bar.

7. The drumstick weight adjustment structure of claim 6, wherein the mounting hole includes a latch trough, the steel bar including a jutting rim corresponding to the latch trough.

8. The drumstick weight adjustment structure of claim 1, wherein the plastic stick holder holds a felt.

9. The drumstick weight adjustment structure of claim 8, wherein the plastic stick holder includes a notch to hold the felt.

* * * * *